(12) United States Patent
Kuo et al.

(10) Patent No.: US 11,755,455 B1
(45) Date of Patent: Sep. 12, 2023

(54) DETECTING AND CORRECTING USER INTERFACE DISCREPANCIES

(71) Applicant: Amazon Technologies, Inc., Seattle, WA (US)

(72) Inventors: Calvin Yue-Ren Kuo, Mercer Island, WA (US); Zhaofeng Zhan, Belfair, WA (US); Stuart Olmstead-Wilcox, Richmond (CA); Tian Chen, Redmond, WA (US); Zheshen Wang, Bellevue, WA (US); Jingyu Dong, Kenmore, WA (US); Dan Catalin Teodorescu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 17/362,842

(22) Filed: Jun. 29, 2021

(51) Int. Cl.
*G06F 16/958* (2019.01)
*G06N 20/00* (2019.01)
*G06F 16/957* (2019.01)
*G06F 11/36* (2006.01)

(52) U.S. Cl.
CPC ...... *G06F 11/3624* (2013.01); *G06F 11/3664* (2013.01); *G06F 16/957* (2019.01); *G06F 16/958* (2019.01); *G06N 20/00* (2019.01)

(58) Field of Classification Search
CPC ............ G06F 11/3624; G06F 11/3664; G06F 16/957; G06F 16/958; G06N 20/00
See application file for complete search history.

(56) References Cited

U.S. PATENT DOCUMENTS

| | | | | |
|---|---|---|---|---|
| 9,495,081 | B2* | 11/2016 | Paniagua | .............. G06F 3/0483 |
| 2020/0081934 | A1* | 3/2020 | Karwan | ............... H04L 67/306 |
| 2021/0092146 | A1* | 3/2021 | Melson | ............... H04L 63/1433 |

* cited by examiner

*Primary Examiner* — Ziaul A Chowdhury
(74) *Attorney, Agent, or Firm* — Klarquist Sparkman, LLP (57) ABSTRACT

Systems and methods are provided for detecting discrepancies in information that is displayed to a user across different webpages of an online shopping system. User interaction with the online shopping system is simulated in one example to collect data relating to webpages of the online shopping system. The data is analyzed to identify relevant semantic blocks of data and compare the data in those blocks across webpages. In an additional example, source code for the webpages is analyzed using machine-learning systems, which are targeted based on the results of the user interaction simulation to identify problematic source code and correct associated issues.

15 Claims, 8 Drawing Sheets

DETECTING AND CORRECTING USER INTERFACE DISCREPANCIES

BACKGROUND

In online shopping, users on a shopping mission often traverse multiple webpages relating to items (e.g., products, services, etc.) of interest. In some examples, shopping-related information for a given item, such as shipping date, price, availability, etc. is presented on different webpages during the shopping mission. For example, while performing a shopping mission that includes searching for and purchasing an item, at least a portion of the shopping-related information is shown on multiple webpages, such as a search results page, item detail page, shopping cart page, etc. In some examples, different webpages use different data sources and/or processes to populate the shopping-related information, which sometimes results in discrepancies in the information shown for the same item on different webpages encountered during a shopping mission. These discrepancies cause user frustration and confusion, decreasing the overall user experience during the shopping mission.

DETAILED DESCRIPTION

Webpages for online shopping merchants are, in some examples, maintained by many different teams and/or services, each team/service contributing to code changes and item/vend data through independent services and widgets. A single user accessing an online shopping merchant typically encounters webpages that involve these different entities during a single shopping mission. As a result, the webpages viewed by the user relating to a targeted item, in some examples, show different information. For example, it is possible for delivery information presented during pre-checkout (e.g., when the user views an item detail page) to differ from delivery information presented during checkout (e.g., when the user views a shopping cart and/or an order checkout page), since the pages use different backend Application Programming Interfaces (APIs). In some examples, other information, such as price, availability, shipping cost, seller, etc. differ between such different webpages encountered during a shopping mission. In any of these examples, the user experience is impacted, as the user is presented with conflicting and/or unexpected information during the shopping mission.

The disclosure provides example mechanisms and technologies for detecting and monitoring for such discrepancies in the user interface provided for an online shopping system. In a first approach, simulated user shopping missions are performed to generate and collect document object models (DOMs) for webpages of the online shopping system. The DOMs are processed to identify discrepancies between shopping information for the same item across different pages and/or different regions of a page. In a second approach, the backend of the online shopping system is tested by examining source code for the webpages for defects. As described in more detail below, in some examples, the first and second approaches are combined to provide a more complete picture of user interface issues and/or to guide the correction of such issues. In one such combination, the first approach is utilized to discover user interface discrepancies, and the webpages that exhibited the discrepancies are targeted for examination by the second approach in order to identify defects that lead to the discrepancies and options for correcting the defects. In this way, the disclosed systems and methods are configured in some examples to detect issues in the user interface, determine a root cause for the issues, correct the issues, and monitor for any resurgence of the issues. Additional examples relating to the detection and correction of user interface issues are described below.

Figure 1:
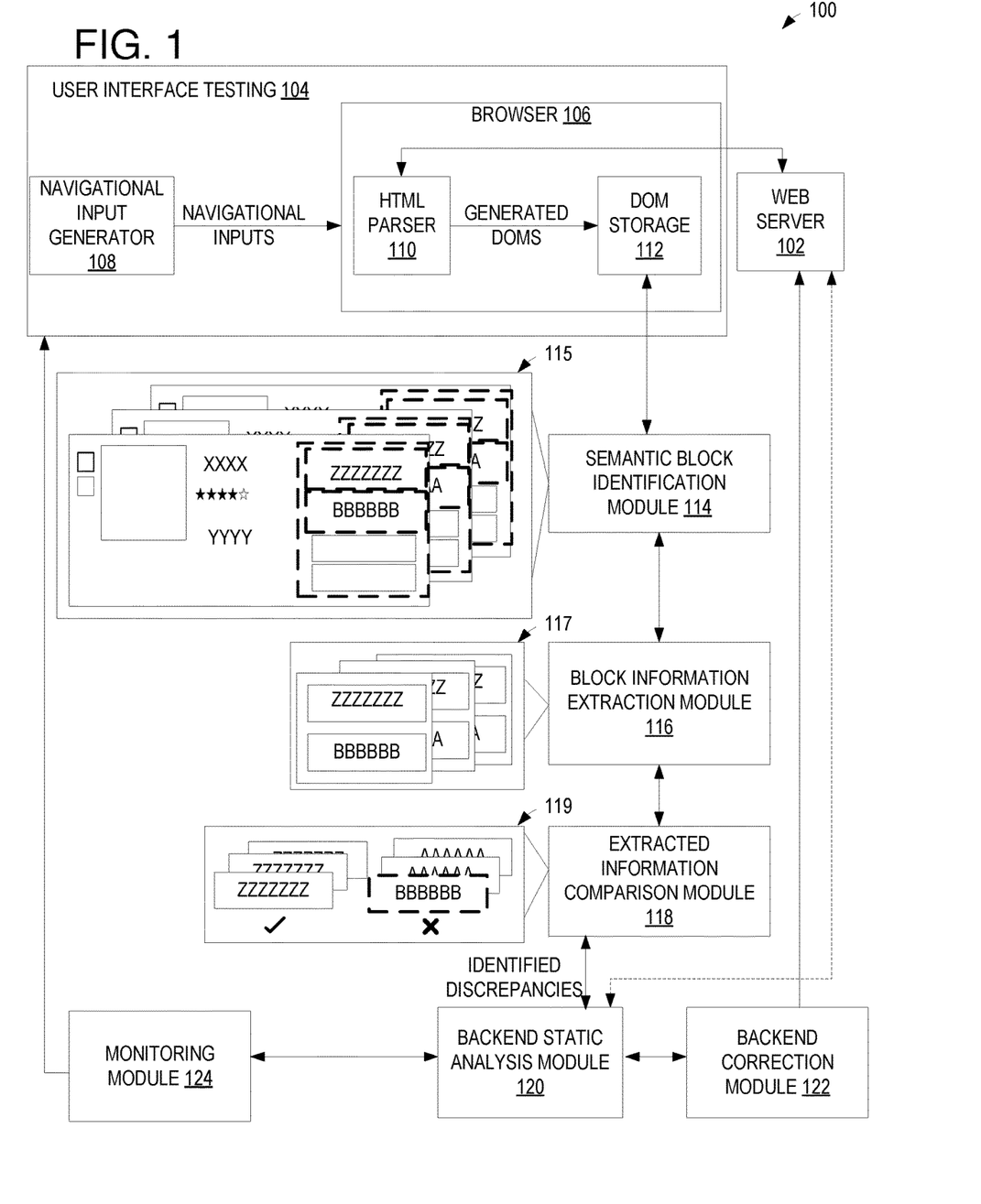
FIG. 1 is a block diagram of an example system for automatically detecting and correcting user interface issues for an online shopping service.

FIG. 1 shows a first embodiment of a system 100 for detecting and correcting issues in a user interface of an online shopping system. For example, the online shopping system is represented by a web server 102 that includes data for generating webpages of the online shopping system (e.g., to enable users to browse and purchase items offered by an online shopping merchant associated with the online shopping mission). As described above, the disclosed systems and methods include components for performing a simulation of a user performing shopping missions with the online shopping merchant in order to identify user interface issues that could arise for a user (e.g., potentially before a real user encounters the issues). Accordingly, the system 100 includes a user interface testing module 104, which includes a browser 106 (e.g., for accessing the web server 102) and navigational input generator 108 (e.g., an autonomous navigational generator) for simulating a user providing input to the browser to conduct shopping missions with the online shopping merchant (e.g., to at least retrieve pages corresponding to one or more products of interest to the simulated user and/or that the simulated user intends to purchase). As shown, the navigational input generator outputs navigational inputs to the browser 106 to control which pages the browser requests from the web server 102 in order to simulate the shopping missions. In one example, the navigational inputs include instructions to load an item search page, an item detail page, a shopping cart page, and a checkout page relating to a targeted item. In other examples, additional or different combinations of pages that are able to be encountered by a user on a shopping mission are instructed to be loaded via the navigational inputs. In this way, the navigational input generator includes scripts, models, and/or other software programs configured to generate navigational inputs simulating user interaction (e.g., user clicks) with the online shopping system during a shopping mission.

It is to be understood that the system described in FIG. 1, in some examples, is additionally or alternatively operated using actual user clicks/input to the online shopping system instead of (or in addition to) the navigational input generated by generator 108. In such examples, the information generated as a result of an actual user interacting with the web server to conduct a shopping mission is captured and analyzed as described below in order to identify discrepancies in information presented to the user across webpages during the shopping mission. In other examples, the navigational inputs are derived based on (or include) past user interactions with the online shopping system. In some of the above-described examples, the navigational input generator includes models and/or software programs that are trained using historical recordings of users interacting with the online shopping system to enable the user interface testing module 104 to navigate the online shopping system autonomously. In some examples, the navigational inputs generated by generator 108 are configured to represent different user personas or cohorts. A distribution of user personas using the online shopping service is used in some examples to control how such personas are cycled through during testing. In a non-limiting example of a strategy for using distributions of user personas to drive the simulations, customer personas that interact with the online shopping service are sampled to cover all edge cases of a long tail of the distribution.

The browser 106 retrieves the webpages from the web server 102, which are provided to a HyperText Markup Language (HTML) parser 110 to generate Document Object Models (DOMs) relating to the retrieved webpages. These generated DOMs are stored in a DOM storage 112, which includes an interface to any suitable storage device that is accessible by the browser 106. In some examples, the DOMs are stored in a storage device that is local to the storage device storing instructions for operating the browser and/or user simulation scripts. In additional or alternative examples, the DOMs are stored in a cloud storage device and/or distributed storage system that is accessible by the browser via a network connection.

The DOMs stored in DOM storage 112 are used by a series of models (e.g., machine-learning models) to extract and process data in the DOMs to identify deficiencies between information configured to be presented on webpages relating to a same item (e.g., for a same simulated user or associated user cohort) during a single (e.g., simulated) shopping mission. For example, the DOMs are provided to a semantic block identification module 114 to identify semantic blocks of interest in the DOMs. The semantic blocks of interest represent, in some examples, regions of the webpage that include shopping information for an item that is shown on different webpages during a shopping mission. Examples of content in semantic blocks of interest include price, shipping information (e.g., delivery date, cost, etc.), availability (e.g., in stock, out of stock, limited quantity remaining, etc.), and/or other information. In some examples, the content of related semantic blocks of interest for different webpages or portions of webpages is controlled by different entities on a backend of the online shopping service.

The semantic block identification module includes, in some examples, a model trained to identify particular regions of the webpages of the online shopping service (e.g., the regions identified in dashed boxes in the schematic representation 115 of pages of the user interface). Although the schematic representation 115 shows the webpages as viewed by a user, it is to be understood that the regions identified by the semantic block identification module 114 are regions of the DOMs that correspond to the illustrated regions. The model is trained by any suitable mechanism, including, in one example, by feeding the model annotated DOMs identifying regions corresponding to semantic blocks of interest (e.g., in order to enable recognition of the corresponding semantic blocks in DOMs generated via simulated user interaction). In some examples, the annotations include an association of key words, strings, and/or tags in the DOMs (e.g., delivery information is associated with a tag in the DOM labelled "DELIVERY_BLOCK" in a non-limiting example) with corresponding semantic blocks. The annotated DOMs are generated, in some examples, by providing a user interface for users to select text/code within sample DOMs and/or a region of a visual representation of a webpage that is generated using the DOM, and associated identifications of semantic blocks associated with the text/code/region. The model is then configured to identify similar regions in input (non-annotated) DOMs to identify blocks of interest for analysis. In some examples, the annotations identify the semantic blocks in the context of the type of page (e.g., a price block for an item detail page and a price block for a shopping cart page is represented differently in the DOMs but represent the same type of semantic block, so the annotations are labelled with respective page type indicators, based on a Uniform Resource Locator (URL) of the pages in some examples), so that the model is able to identify the same type of semantic blocks across different webpages. In some examples, the model identifies the URL of the page and identifies semantic blocks based on the training data received for associated types of webpages.

The semantic blocks of interest identified by module 114 are provided to a block information extraction module 116 to extract text/characters from the blocks (e.g., to normalize the information in a format that is able to be compared across corresponding webpages). For example, as shown in the schematic representation 117 of extracted text blocks, the content of the block is reduced to only the relevant text, and each sub-block of content is separated (e.g., "ZZZZZZ" is separated from "BBBBBB" for the top extracted block). The block information extraction module 116 in some examples includes a model trained to identify and extract the text from the identified semantic blocks of the DOMs (e.g., to strip away the other content of the DOMs and to separate the text of each discrete sub-block from one another). In one example, the model included in module 116 is trained by providing expected input/output pairs, each of which includes a DOM and a corresponding output of text extracted from a targeted region of the DOM. In some examples, the model is trained via annotated DOMs similarly to the training of the semantic block identification module described above, where the annotations associate locations of text/content of interest within the identified semantic blocks. In this way, the model is trained to identify content that can be stripped away and content that is to be extracted.

Once extracted, the block information from module 116 is provided to extracted information comparison module 118 to identify differences in the sub-blocks of text across multiple webpages. For example, as shown in the schematic representation 119 of a comparison result, the text of the first sub-blocks of the DOM (e.g., the "ZZZZZZ" blocks, which represent a first set of information, such as price) are shown to be without issue since the text is the same across the webpages. However, the text of the second sub-blocks of the DOM (e.g., the "AAAAAA"/"BBBBBB" blocks, which represent a second set of information, such as shipping speed) are shown to have an issue since the top sub-block shows different text that the bottom two sub-blocks.

The comparison module 118 outputs an indication of identified discrepancies in order to allow the issues leading to the discrepancies to be corrected. In some examples, the output may include an alert to a management entity/team responsible for maintaining webpages/content associated with the discrepancies. In the illustrated example, the indication is provided to a backend static analysis module 120. The backend static analysis module 120 includes one or more software programs configured to analyze source code associated with the webpages (e.g., by accessing the web server 102 and/or source code used to control the web server 102) in order to identify issues that could potentially lead to issues in the user interface. In some examples, the software programs generate and/or analyze call graph representations of the source code to identify defects in the source code that are tied to likely causes of inconsistency across different entities associated with the online shopping system. The static analysis module 120 analyzes a single source code file or module at a time in some examples. In additional or alternative examples, the static analysis module 120 analyzes interactions between systems and services associated with the online shopping system, as described in more detail below with respect to FIG. 4.

In some examples, the systems/services of the online shopping system utilize logic written in multiple programming languages. The static analysis module 120 is configured to normalize the features to be extracted from the different languages. For example, the module 120 includes language parsers that are configured to build graph representations of the different languages. In some examples, the module 120 further includes a model that extracts and normalizes semantic features from the graphs built by the language parsers. Additional instructions in the module 120 are used in some examples to build or retrieve a dependency graph of services responsible for generating and displaying content to customers. For example, each service's API is used in some examples to retrieve an associated dependency graph as edges in a normalized format (e.g., JavaScript Object Notcation [JSON], comma-separated values [CSV], etc.).

Further instructions in the module 120 include, in some examples, instructions to traverse the dependency graph and connect the call graph representing all logic used to produce fields and values across multiple services of the online shopping system. In some examples, an additional model is included in the module 120 for detecting call patterns that cause inconsistencies in output via the user interface. The call pattern recognizing model is trained, in one example, using source code from the online shopping merchant's code repository. The model learns directly from the parsed source code or a representation thereof in some examples. In additional or alternative examples, the model learns from the generated call graphs.

The static analysis module 120 is used in some examples to determine a root cause of issues detected by the comparison module 118. In some examples, the static analysis module 120 operates independently to identify issues and their root causes (e.g., the static analysis module 120 is used to examine source code during build time and/or as ongoing monitoring in a first example, and in a second example is additionally or alternatively used to target particular source code based on the output of the comparison module 118). In any of the above examples, the static analysis module 120 outputs information relating to the issues to enable the correction of the issues and/or further monitoring for a resurgence of the issue. In one example, the static analysis module 120 outputs an indication of source code identified as being responsible for (or a likely cause of) a discrepancy in output information via the user interface to a backend correction module 122. The backend correction module 122 includes, in some examples, instructions to enable the automatic correction of issues in the source code, which is then propagated to the web server 102 and/or a repository corresponding to the source code that had the issue, so that the source code with the issue is corrected (e.g., adjusted in accordance with the correction identified by the backend correction module 122). In some examples, the backend correction module 122 includes a mechanism to enable an indication of the issue to be output to a management entity and to receive input from the management entity (e.g., via a user interface) to correct the source code.

The backend static analysis module 120, in some examples, additionally or alternatively sends an indication of the identified issues to a monitoring module 124. In some examples, the monitoring module 124 is in communication with the user interface testing module 104 to control the user interface testing module 104 to target particular webpages (e.g., pages for particular items and/or pages including content management by a particular entity identified as exhibiting issues) during shopping mission simulations. In this way, the results of the user interface testing are, in some examples, fed back into the testing module 104 to guide the monitoring of the online shopping system (e.g., to control the system to continue to monitor the webpages determined to exhibit discrepancies in order to confirm that the displayable content is aligned after modifying the source code and/or otherwise addressing the issue). In additional or alternative examples, the monitoring module 124 controls the user interface testing module 104 to test webpages based on other criteria, such as item popularity (e.g., items having low popularity/purchase statistics are targeted, since the low popularity could be due to issues with the output of information about these items), services/entities associated with providing information for webpages (e.g., services/entities that historically have issues populating data in the webpages are targeted, since this could be indicative of future issues), etc. In some examples, the feedback sent from the monitoring module 124 (and/or output from any of the other modules 114-122) is provided back to any of the models described herein in order to serve as additional training for the models. In one such example, the feedback from the monitoring module 124 (e.g., correlating to detected differences in the displayable content between corresponding semantic blocks) is provided to the semantic block identification module 114 and/or the block information extraction module 116 in order to further train the models (e.g., supervised training) used to identify semantic blocks and/or extract relevant content from the semantic blocks.

Figure 2A:
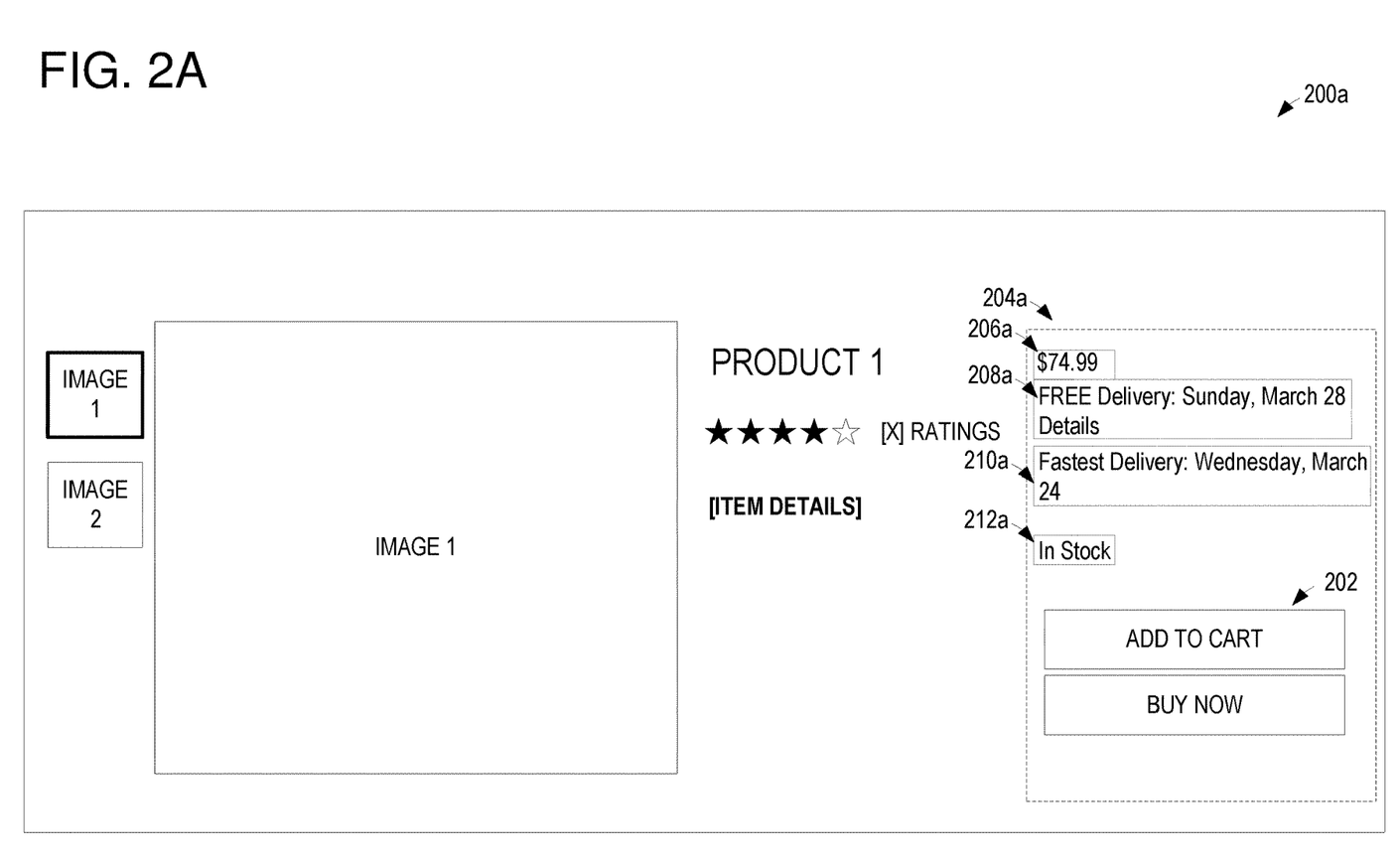
FIGS. 2A and 2B show example portions of user interfaces showing discrepancies between shopping information for the same item shown on different pages encountered during a shopping mission.
Figure 2B:
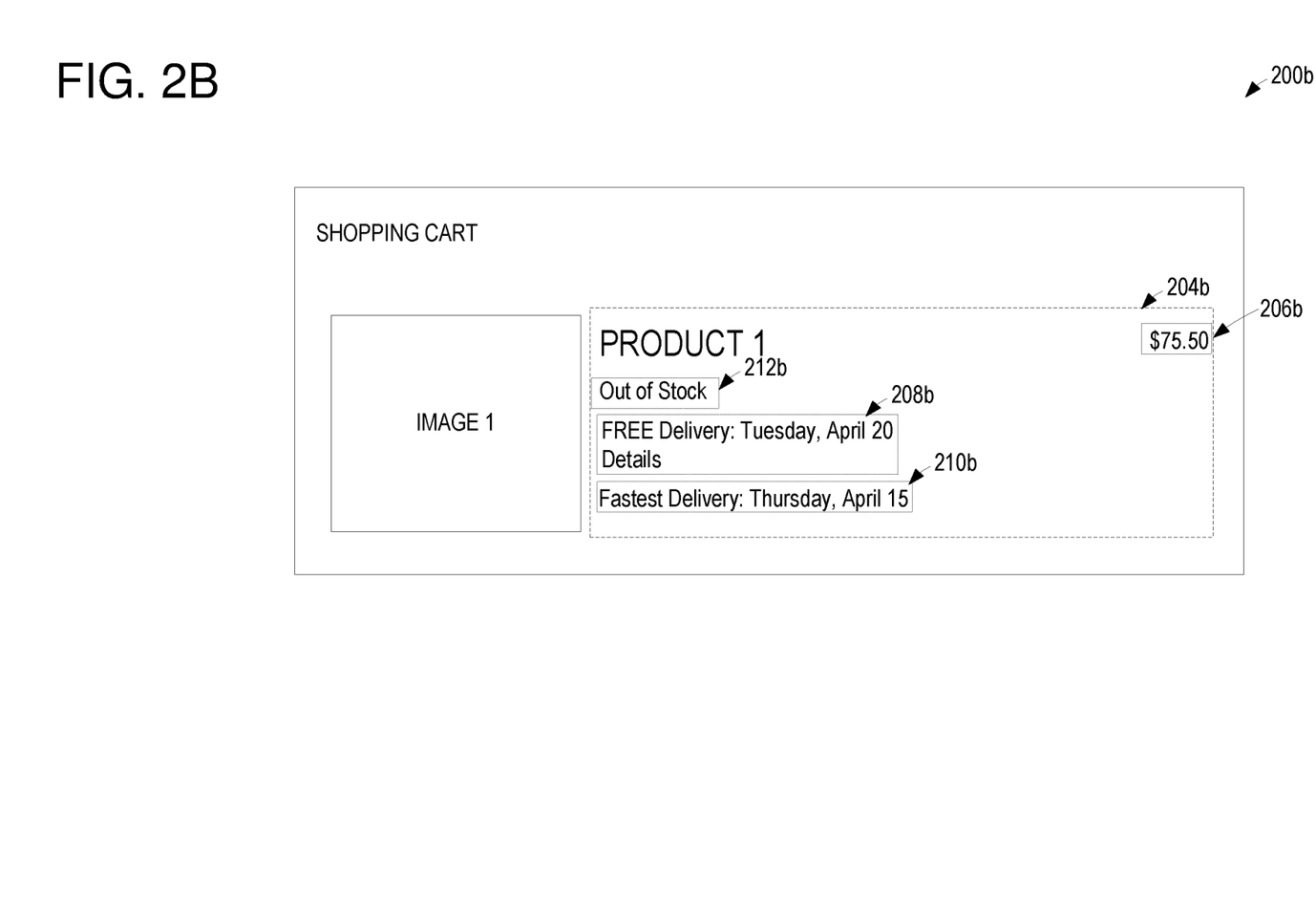

FIGS. 2A and 2B show example portions of a user interface for an online shopping system. FIG. 2A shows an example portion of an item detail page 200*a* relating to a targeted item (e.g., a product or service; in the illustrated example, "Product 1"), while FIG. 2B shows an example portion of a shopping cart page 200*b* that includes the targeted item. For example, page 200*b* of FIG. 2B is configured to be presented to a user after the user selects the "Add to Cart" user interface element 202 on page 200*a* and proceeds to view the cart. In this way, page 200*b* corresponds to a webpage that is viewed for the same item shown on page 200*a*, and pages 200*a* and 200*b* correspond to the same shopping mission.

The item detail page 200*a* includes a first semantic block 204*a* that includes multiple sub-blocks of content of interest, including a price block 206*a*, a first shipping option block 208a, a second shipping option block 210a, and an availability block 212a. The shopping cart page 200b includes a second semantic block 204b that is determined to correspond to block 204a, as it includes overlapping types of information for the same item shown in page 200a. Accordingly, semantic block 204b includes a price block 206b, a first shipping option block 208b, a second shipping option block 210b, and an availability block 212b. As shown, the sub-blocks in pages 200a and 200b are shown in different places, and may be represented slightly differently in the corresponding DOMs for pages 200a and 200b.

As further shown, the information shown in each of the sub-blocks of page 200b are different than those of page 200a. These discrepancies, if encountered by a user, decrease the overall user experience with the online shopping system, as the user could fail to notice the changes (causing the user to expect the product to be shipped sooner or to cost less than shown in page 200b) and/or the user could decide they do not want the product in light of the differentiating details on the shopping cart page 200b and lose confidence in the accuracy of the information presented by the online shopping system. The systems and methods described herein are performed to reduce or eliminate these user experiences by encountering such discrepancies in a simulated manner and correcting the underlying issues. It is to be understood that the pages 200a and 200b of FIGS. 2A and 2B are non-limiting illustrative examples. In other examples, the processes and systems described herein are used to identify discrepancies between pages that appear differently than those of FIGS. 2A and 2B. In some examples, discrepancies are detectable using the described processes and systems even when two pages have different combinations of semantic blocks/sub-blocks. In such examples, the overlapping blocks/sub-blocks (e.g., semantic blocks/sub-blocks that are present in each page) are compared to identify the discrepancies.

Figure 3:
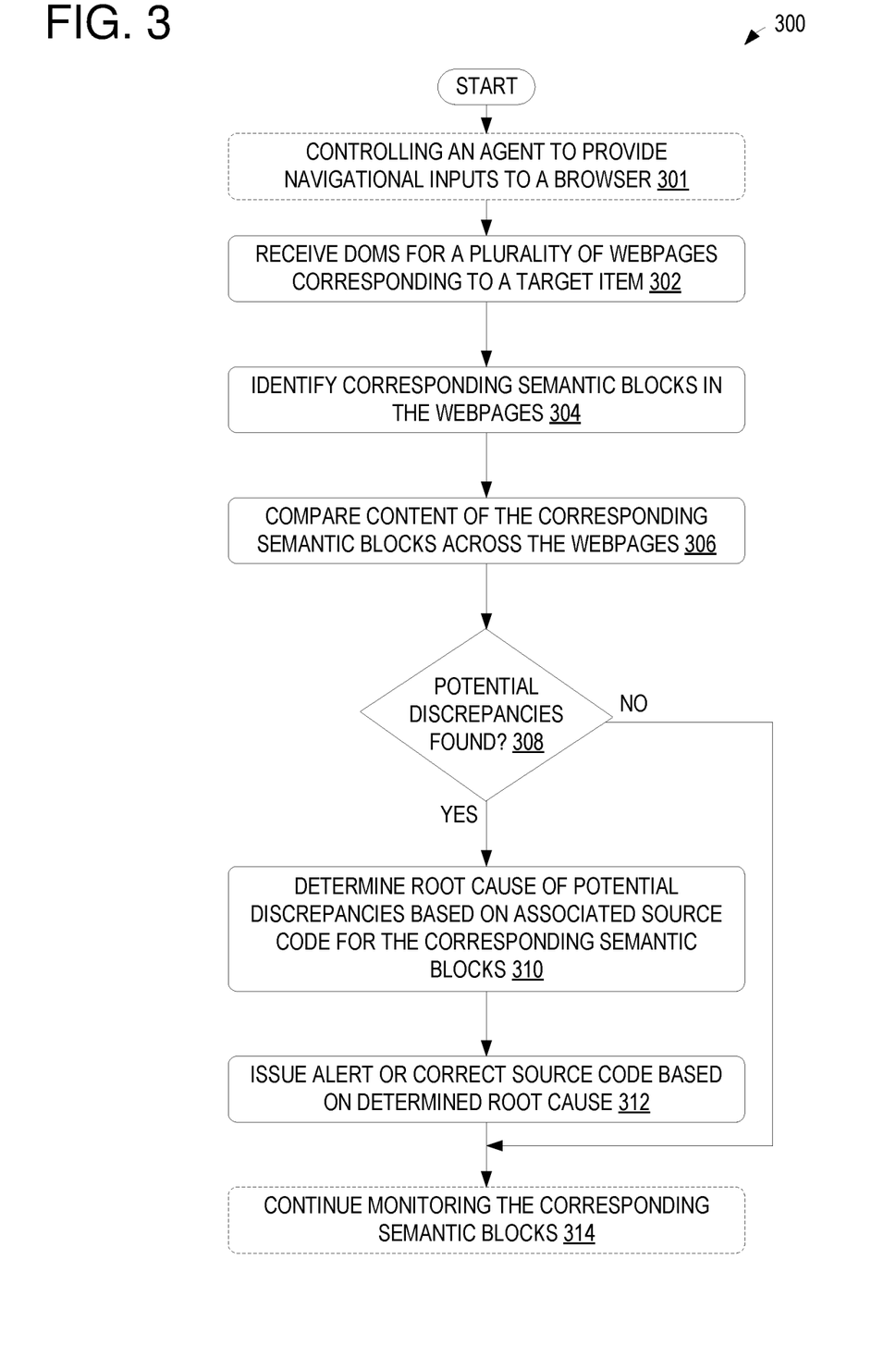
FIG. 3 is a flow chart of an example method of detecting user interface issues for an online shopping service.

FIG. 3 shows an example method 300 for identifying user interface issues including discrepancies between similar information shown on different webpages. In some examples, the method 300 is performed by a monitoring system, such as system 100 of FIG. 1, in association with an online shopping service. At 301, the method optionally includes controlling an agent to provide navigational inputs to a browser. In some examples, the agent is a programmable engine configured to generate and output navigational inputs simulating one or more users/user personas of the online shopping service. The navigational inputs are provided to a browser in communication with the agent in order to navigate between webpages of the online shopping service in an automated manner to simulate the user(s)/persona(s) conducting a shopping mission. An example agent includes the navigational input generator 108 of FIG. 1.

At 302, the method includes receiving DOMs for a plurality of webpages corresponding to a target item. As shown in FIGS. 2A and 2B, information for a target item (e.g., Product 1), in some examples, is shown on different webpages, such as different webpages encountered during a shopping mission (e.g., a search page, an item detail page, a shopping cart page, a checkout page, etc.). A browser, such as browser 106, is used in some examples to generate the DOMs from HTML retrieved from a web server (e.g., based on the navigational input provided by the agent at 301 in some examples).

At 304, the method includes identifying corresponding semantic blocks in the web pages. As described with respect to FIG. 1, a model, such as the model included in semantic block identification module 114, is used in some examples to parse the DOMs and identify blocks that include information for the targeted item that can be shown in different webpages corresponding to the targeted item.

At 306, the method includes comparing the content of the corresponding semantic blocks across the webpages. As described with respect to FIG. 1, a model, such as the model included in block extraction module 116, is used in some examples to extract the text from the semantic blocks identified at 304. The extracted text is then compared using a module, such as extracted information comparison module 118, to identify discrepancies between the information shown in the semantic blocks across the webpages. For example, differences in price, shipping options, availability, etc. presented in different webpages for the targeted item are identified at 306. In some examples, the comparison is performed for different webpages that are accessed as part of a same shopping mission and/or within a threshold period of time from one another.

At 308, the method includes determining if any potential discrepancies are found between the content of the corresponding semantic blocks. If no potential discrepancies are found (e.g., "NO" at 308), the method returns to continue monitoring. If one or more potential discrepancies are found (e.g., "YES" at 308), the method includes determining a root cause of the potential discrepancies based on associated source code for the corresponding semantic blocks, as indicated at 310. For example, a backend analysis (e.g., using backend static analysis module 120 of FIG. 1) is performed on source code associated with the webpages identified as having discrepancies in the semantic blocks in order to determine a reason for the discrepancies, as described above with respect to FIG. 1.

At 312, the method includes issuing an alert or corrected source code based on the determined root cause. For example, a correction module, such as backend correction module 122 of FIG. 1, is used to correct (e.g., automatically and/or based on user input) the source code corresponding to the webpages that exhibited the discrepancies in order to correct the issue causing the discrepancies. At 314, the method includes continuing to monitor the corresponding semantic blocks. For example, since the semantic blocks were identified as having discrepancies, they are monitored further to ensure the issue does not arise again. In additional or alternative examples, once corrected, the target of the monitoring may be adjusted away from webpages/semantic blocks associated with the source code identified as having issues, once the code is corrected.

Figure 4:
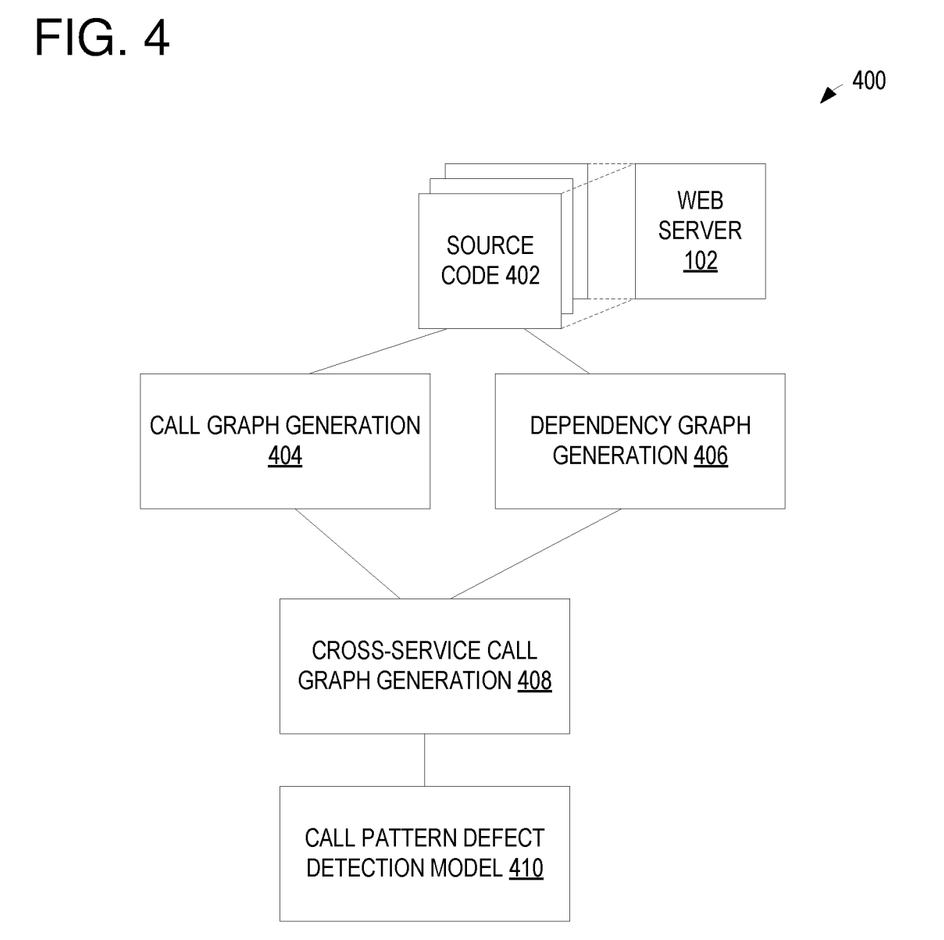
FIG. 4 is a block diagram of an example machine learning-assisted static analysis system for detecting potential defects in source code for webpages of an online shopping system.

FIG. 4 is a block diagram schematically depicting an example machine learning-assisted static analysis system 400 for detecting potential defects in source code for webpages of an online shopping system. In some examples, components of system 400 are included in the backend static analysis module 120 of FIG. 1. As shown in FIG. 4, the web server 102 of an online shopping system is operated in accordance with source code 402. The source code 402 is managed by multiple entities, and in some examples includes code written in multiple programming languages and/or according to multiple parameters. As an illustrative example, in order to generate the item detail page 200a of FIG. 2A, multiple different blocks of the source code 402 are used, for example, one or more blocks to generate the layout of the page and one or more blocks to generate the content to fill in different portions of the page. Likewise, different (e.g., additional) blocks of source code 402 are used to generate the shopping cart page 200b of FIG. 2B in some examples. In each example, the different blocks of source code 402 work together (e.g., using call functions) to create the associated webpages for display. In some examples, the features to be extracted from the different languages in the source code 402 are normalized by logic. The logic includes, in some examples, language parsers that build graph representations of the different languages, which allows a model to extract and normalize semantic features from the graphs. Such processing enables the system to build the graphs described below in some examples.

In order to process the source code to identify potential issues and/or root causes of issues, the system 400 includes a call graph generation module 404 and a dependency graph generation module 406. The call graph generation module 404 examines each block of source code 402 individually to build a graph of calling relationships between subroutines of the source code (e.g., to represent calls made between different backend services responsible for different portions or aspects of the webpage/source code). The dependency graph generation module 406 examines the connections between blocks of source code 402 and builds a dependency graph of services responsible for generating and displaying content to users (e.g., dependencies between the different blocks of source code). For example, all blocks of source code used to populate an item detail page for an item are connected in the dependency graph as being used to generate and display the item detail page for a user.

The system 400 further includes a cross-service call graph generation module 408 that traverses the dependency graph and connects the call graphs for each associated block of source code represented therein in order to generate a call graph that represents all logic used to produce fields and values across multiple services of the online shopping system. A call pattern defect detection model 410 analyzes the cross-service call graph from module 408 to detect patterns that cause user-observable inconsistencies in webpages. The model 410 is, in some examples, trained using source code (e.g., directly parsed source code and/or a call graph generated from the source code) from a target repository associated with the online shopping merchant providing the online shopping system. The training data includes annotated source code indicating source code that historically caused user-observable inconsistencies. As the system discovers new issues in the source code, such discoveries are fed back to continue training the system.

Figure 5:
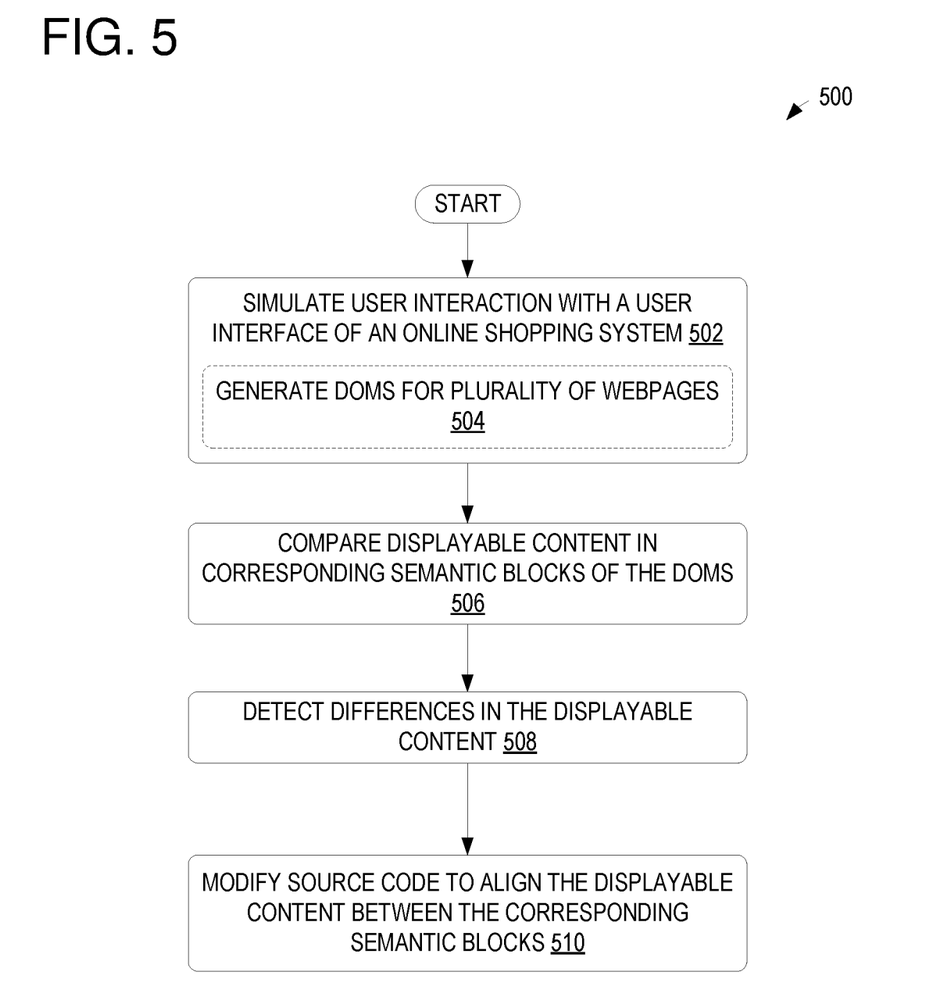
FIG. 5 is a flow chart of an example method of detecting and correcting user interface issues using simulated user interactions.

FIG. 5 is a flow chart of an example method 500 of detecting and correcting user interface issues using simulated user interactions. In some examples, the method 500 is performed by components of a monitoring system, such as system 100 of FIG. 1, in association with an online shopping service. At 502, the method includes simulating user interaction with a user interface of an online shopping system, in order to generate DOMs for a plurality of webpages, as indicated at 504. In some examples, as described above with respect to the user interface testing module 104 of FIG. 1, the user interaction simulation is performed using user simulation scripts that issue navigational commands simulating a user clicking on user interface elements of the user interface to conduct a shopping mission. The user clicks result in the retrieval of webpage data, which is parsed and used to generate the DOMs.

At 504, the method includes comparing displayable content in corresponding semantic blocks of the DOMs. In some examples, as described above with respect to the modules 114-118 of FIG. 1, the DOMs are passed through one or more models to identify the semantic blocks that include displayable content of interest. For example, displayable content of interest includes content that is expected to remain unchanged across webpages corresponding to a same item while conducting a shopping mission. Corresponding semantic blocks refer to semantic blocks for multiple webpages that are expected to include the same information for a given user in a given shopping mission (e.g., semantic blocks that include a price of an item, shipping options for the item, an item availability, etc.).

At 508, the method includes detecting differences in the displayable content. FIGS. 2A and 2B illustrate examples of differences in displayable content of corresponding semantic blocks (e.g., differences in the price, shipping options, availability, etc. that is configured for display to a user). At 510, the method includes modifying source code (e.g., source code of at least one of the webpages exhibiting a difference in displayable content of a semantic block relative to the corresponding semantic blocks for other webpages) to alter and align the displayable content between the corresponding semantic blocks. In this way, the source code is corrected to ensure that a user that conducts a shopping mission is shown the same information for the item across different webpages relating to the item. For illustrative purposes of the following example, it is assumed that the root cause of the discrepancy between page 200a and 200b of FIGS. 2A and 2B is due to an issue with the source code used to generate content for page 200b. In such an example, after modification of the source code corresponding to the generation of the shopping cart page 200b of FIG. 2B, the displayable content in the semantic blocks of FIG. 2B, when retrieved under the same conditions used to originally retrieve page 200b, will align with the displayable content in the corresponding semantic blocks of FIG. 2A (e.g., the content of block 206b will match the content of block 206a to reflect the same price, etc.).

Figure 6:
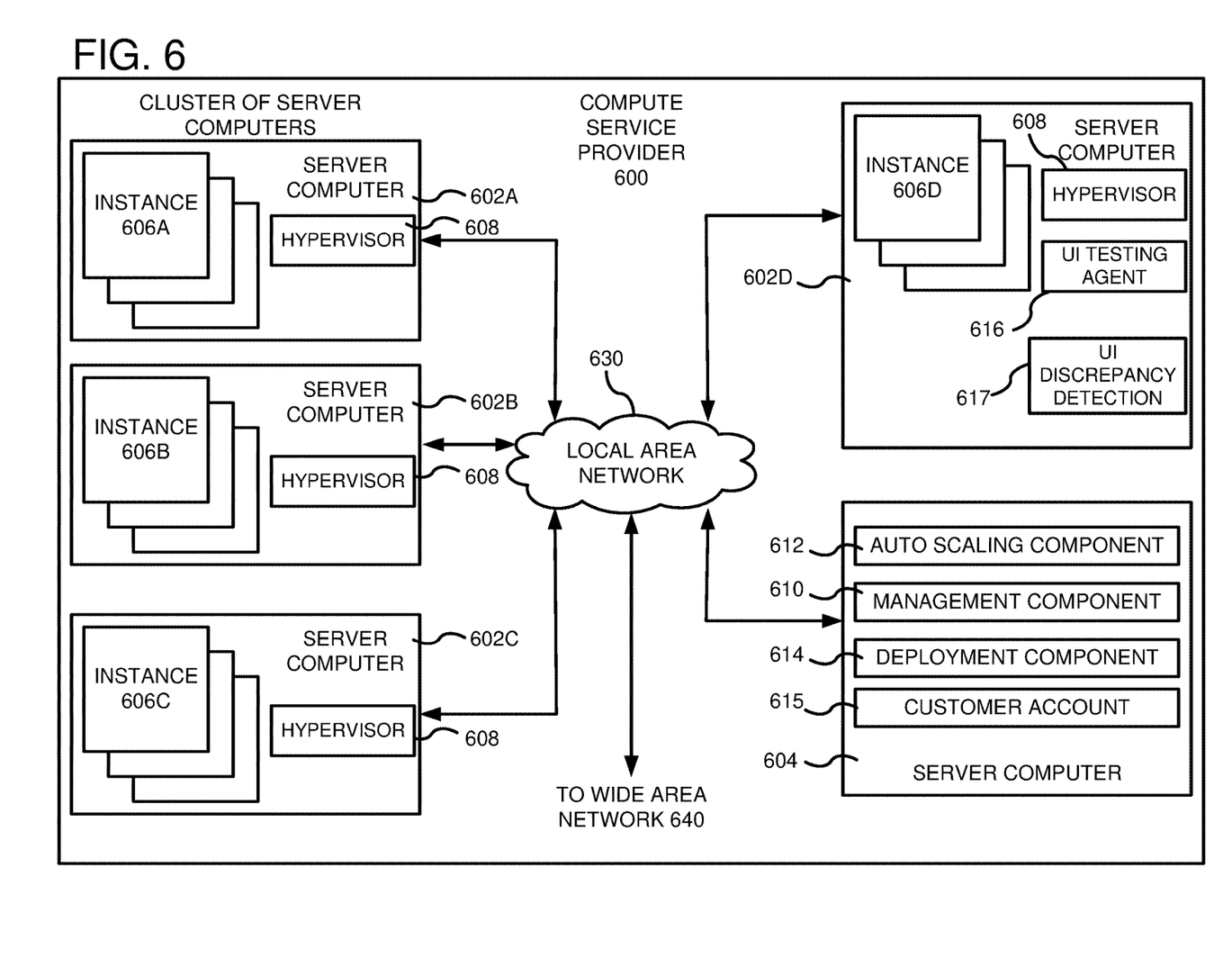
FIG. 6 is an example system diagram depicting a plurality of virtual machine instances running in a multi-tenant environment.

FIG. 6 is a computing system diagram of a network-based compute service provider 600 that illustrates one environment in which embodiments described herein can be used. In some examples, one or more components of the systems described herein, such as the navigational input generator 108 and/or the modules 114-124 of FIG. 1 are implemented via a network-based compute service provider such as provider 600. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

In some examples, one or more of the server computers 602 are configured to execute operations to perform the functions of one or more of the components described here, such as the modules of system 100 in FIG. 1. For example, as shown, server computer 602*d* includes a User Interface (UI) testing agent 616, which may be an example of the navigational input generator 108 and/or related components of the UI testing module 104 of FIG. 1, and UI discrepancy detection unit 617, which may include one or more of the modules 114-124 of FIG. 1 used to parse DOMs, identify discrepancies between information in semantic blocks across webpages, perform backend static analysis, and correct/provide feedback related to the identified discrepancies. Although shown as being included in the same server computer for illustrative purposes, it is to be understood that the agent 616 and unit 617 and/or the individual components of FIG. 1 are distributed across multiple server computers in other examples. In some examples, the agent 616 and unit 617 are executed as instances 606 in the associated server computers.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise Clos networks or other types of multi-tiered network fabrics. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and network devices can be utilized to interconnect the various computing systems disclosed herein.

Figure 7:
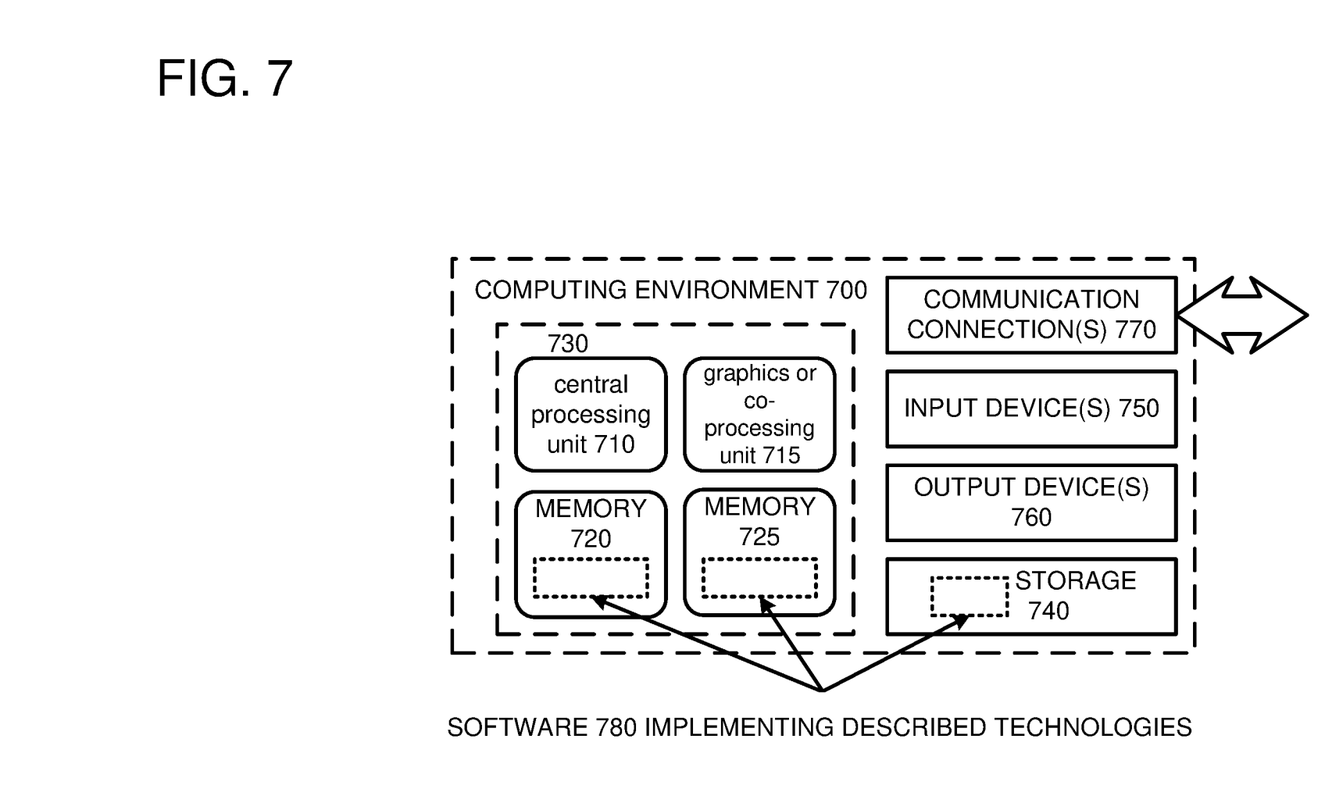
FIG. 7 depicts a generalized example of a suitable computing environment in which the described innovations may be implemented.

FIG. 7 depicts a generalized example of a suitable computing environment 700 in which the described innovations may be implemented. In some examples, one or more of the components of the computing environment 700 include and/or are included in the system 100 of FIG. 1 and/or the system 400 of FIG. 4. In some examples, the computing environment 700 is used to perform the method 300 of FIG. 3 and/or method 500 of FIG. 5 (e.g., in order to analyze webpages and identify inconsistencies in the displayed content across webpages, examples of which are shown in FIGS. 2A and 2B). The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). The memory 720, 725 stores, in some examples, instructions executable by the central processing unit 710 and/or graphics/co-processing unit 715 to perform the method 300 of FIG. 3 and/or method 500 of FIG. 5. In additional or alternative examples, instructions for different operations of method 300/500 and/or associated components of systems 100 of FIG. 1/400 of FIG. 4 are stored in associated memories and executable by associated processors in a distributed computing configuration. In one such example, one instance of memory 720, 725 stores instructions associated with the navigational input generator 108 and browser 106 of FIG. 1, while another instance of memory 720, 725 (e.g., in another computing environment 700) stores instructions associated with one or more of the modules 114-118 and/or the backend static analysis module 120 of FIG. 1.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700. For example, the output device(s) 760 include, in some examples, a display for displaying a webpage, such as webpage 200a of FIG. 2A or webpage 200b of FIG. 2B, and/or for displaying a user interface to output alerts relating to identified issues with the user interface based on analysis performed by system 100 of FIG. 1 and/or system 400 of FIG. 4.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method comprising:
    simulating user interaction with an online shopping system user interface to generate requests for displayable webpage data for a plurality of webpages from a web server associated with the online shopping system and to generate a plurality of document object models (DOMs) associated with the webpage data;
    applying the DOMs to a model to identify semantic blocks of the displayable webpage data for the plurality of webpages;
    extracting information from the identified semantic blocks of data;
    comparing the extracted information from the identified semantic blocks across the plurality of webpages;
    detecting differences between the extracted information from a first identified semantic block of a first webpage with the extracted information from a second, corresponding semantic block of a second webpage;
    analyzing source code associated with the first and second webpages to determine a root cause of the difference, wherein the source code is analyzed using a machine learning-assisted backend analysis unit comprising computer-executable instructions to generate call graphs for the source code and a dependency graph for the source code, and wherein the machine learning-assisted backend analysis unit further comprises computer-executable instructions to apply the call graphs and the dependency graph to a call pattern defect detection model to identify issues in the source code relating to calls between source code provided by different backend services; and
    modifying the source code corresponding to at least one of the first and second webpages to correct the identified issues in the source code relating to calls between source code provided by different backend services.

2. The method of claim 1, wherein the user interaction with the online shopping system user interface is simulated using one or more autonomous navigational generators that provide navigational input to a web browser accessing a web server associated with the online shopping system to simulate a user conducting a shopping mission.

3. The method of claim 2, wherein the one or more autonomous navigational generators are configured to provide navigational input based on the detection of the differences in the extracted information in order to continue to monitor the first and second webpages to confirm displayable content is aligned after modifying the source code.

4. The method of claim 1, wherein applying the DOMs to a model to identify semantic blocks of the displayable webpage data for the plurality of webpages comprises applying the DOMs to a machine-learning model that is trained at least using feedback correlating to the detected differences in the displayable content extracted information from the first and second semantic blocks.

5. The method of claim 1, wherein applying the DOMs to a model to identify semantic blocks of the displayable webpage data for the plurality of webpages comprises applying the DOMs to a machine-learning model that is trained at least via input of annotated DOMs associated with the online shopping system user interface, the annotated DOMs identifying semantic blocks of interest to enable recognition of the corresponding semantic blocks in the DOMs generated via the simulated user interaction.

6. The method of claim 1, further comprising outputting an indication of the detected differences to the backend analysis module configured to analyze source code used to generate content for the plurality of webpages.

7. A system for analyzing output via a user interface for an online shopping system, the system comprising:
    a memory configured to store computer-executable instructions; and
    a processor in communication with the memory configured to execute the computer-executable instructions to:
        simulate user interaction with the online shopping system to generate requests for displayable webpage data for a plurality of webpages from a web server associated with the online shopping system;
        generate document object models (DOMs) associated with the webpage data;
        apply the DOMs to a model to identify semantic blocks of the displayable webpage data for each of the plurality of webpages;
        extract information from the identified semantic blocks of data;
        compare the extracted information from the identified semantic blocks across the plurality of webpages;
        detect a difference between the extracted information from a first identified semantic block of a first webpage with the extracted information from a second, corresponding semantic block of a second webpage;
        analyze source code associated with the first and second webpages to determine a root cause of the difference, wherein the source code is analyzed using a machine learning-assisted backend analysis unit comprising computer-executable instructions to generate call graphs for the source code and a dependency graph for the source code, and wherein the machine learning-assisted backend analysis unit further comprises computer-executable instructions to apply the call graphs and the dependency graph to a call pattern defect detection model to identify issues in the source code relating to calls between source code provided by different backend services; and modify the source code associated with at least one of the first and second webpages to correct the identified issues in the source code relating to calls between source code provided by different backend services.

8. The system of claim 7, wherein the modified source code is configured to alter the displayable webpage data for the associated first or second webpage to be in alignment with one another.

9. The system of claim 7, wherein the model is a first model, the system further comprising a second model, and wherein extracting the information from the identified semantic blocks of data comprises applying the information from the identified semantic blocks of data to the second model to extract and separate information that is comparable between the plurality of webpages.

10. The system of claim 7, further comprising one or more autonomous navigational input generators configured to provide navigational inputs to a browser to simulate the user interaction with the online shopping system.

11. One or more non-transitory computer-readable media comprising computer-executable instructions, the computer-executable instructions comprising:

a user interface testing module configured to simulate user interaction with an online shopping system user interface by applying navigational inputs to a web browser to generate a plurality of document object models (DOMs) associated with displayable webpage data for a plurality of webpages;

a plurality of machine-learning models configured to analyze the DOMs to identify corresponding semantic blocks of the displayable webpage data for the plurality of webpages, extract information from the identified semantic blocks, compare the extracted information from the identified semantic blocks across the plurality of webpages, and detect differences in displayable content between corresponding semantic blocks of two or more of the plurality of webpages;

a machine learning-assisted backend analysis module configured to analyze source code corresponding to at least one of the two or more webpages to identify a root cause of the detected differences, wherein the machine learning-assisted backend analysis module comprises computer-executable instructions to generate call graphs for the source code and a dependency graph for the source code, and wherein the machine learning-assisted backend analysis module further comprises computer-executable instructions to apply the call graphs and the dependency graph to a call pattern defect detection model to identify issues in the source code relating to calls between source code provided by different backend services; and a backend correction module configured to modify the analyzed source code based on the identified root cause to align the displayable content between the corresponding semantic blocks of the two or more webpages.

12. The one or more non-transitory computer-readable media of claim 11, wherein the simulated user interaction with the online shopping system includes a simulation of a shopping mission, and wherein the plurality of webpages includes multiple webpages corresponding to an item that a simulated user intends to purchase.

13. The one or more non-transitory computer-readable media of claim 12, wherein the plurality of webpages includes one or more of an item detail page for the item, a shopping cart page for a shopping cart that includes the item, or a checkout page for purchasing the item.

14. The one or more non-transitory computer-readable media of claim 12, wherein the displayable content includes one or more of a price of the item, shipping options for the item, or an availability of the item.

15. The one or more non-transitory computer-readable media of claim 11, wherein corresponding displayable content for different webpages of the plurality of webpages is managed by different backend services.

\* \* \* \* \*